(12) United States Patent
Howarth et al.

(10) Patent No.: US 11,339,717 B2
(45) Date of Patent: May 24, 2022

(54) ENVIRONMENTAL CONTROL SYSTEM

(71) Applicant: ROLLS-ROYCE plc, London (GB)

(72) Inventors: Nicholas Howarth, Derby (GB); Amarveer S Mann, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/113,910

(22) Filed: Dec. 7, 2020

(65) Prior Publication Data

US 2021/0172374 A1     Jun. 10, 2021

(30) Foreign Application Priority Data

Dec. 9, 2019  (GB) ..................... 1917964

(51) Int. Cl.
| | | |
|---|---|---|
| *B64D 13/08* | (2006.01) | |
| *F02C 6/08* | (2006.01) | |
| *F02C 7/18* | (2006.01) | |
| *B64D 13/06* | (2006.01) | |
| *F02C 7/057* | (2006.01) | |
| *F02C 7/04* | (2006.01) | |
| *F02C 7/36* | (2006.01) | |

(52) U.S. Cl.
CPC ............. *F02C 7/057* (2013.01); *B64D 13/08* (2013.01); *F02C 6/08* (2013.01); *F02C 7/04* (2013.01); *F02C 7/18* (2013.01); *F02C 7/36* (2013.01); *B64D 2013/0607* (2013.01); *B64D 2013/0625* (2013.01)

(58) Field of Classification Search
CPC .... F02C 6/08; F02C 9/18; F02C 7/057; F02C 7/047; F02C 7/36; F02C 7/32; F02C 7/18; F02C 7/14; B64D 2013/0607; B64D 2013/0625
See application file for complete search history.

(56) References Cited

U.S. PATENT DOCUMENTS

| | | | | |
|---|---|---|---|---|
| 10,456,074 | B2* | 10/2019 | Penders | A61B 5/4356 |
| 2010/0251726 | A1* | 10/2010 | Jones | F02C 7/32 |
| | | | | 60/773 |
| 2013/0098059 | A1* | 4/2013 | Suciu | F02C 9/16 |
| | | | | 60/783 |

(Continued)

FOREIGN PATENT DOCUMENTS

EP     2584172 A2     4/2013

OTHER PUBLICATIONS

Apr. 14, 2021 extended Search Report issued in European Patent Application No. 20209452.0.

*Primary Examiner* — Todd E Manahan
*Assistant Examiner* — Rodolphe Andre Chabreyrie
(74) *Attorney, Agent, or Firm* — Oliff PLC

(57) ABSTRACT

The present disclosure relates to a gas turbine engine for an aircraft comprising: an engine core comprising a turbine, a compressor, and a core shaft; and an environmental control system mounted on the engine core comprising a first air passage arranged to deliver air from outside the engine core to an aircraft cabin and/or for wing anti icing, a subsidiary compressor located in the first air passage and arranged to compress air in the first air passage, the subsidiary compressor being powered by the core shaft, and a second air passage arranged to inject air from the compressor into the first air passage.

11 Claims, 7 Drawing Sheets

(56) References Cited

U.S. PATENT DOCUMENTS

| | | | | |
|---|---|---|---|---|
| 2015/0121842 A1* | 5/2015 | Moes | ............ | F02K 3/075 |
| | | | | 60/204 |
| 2015/0275758 A1* | 10/2015 | Foutch | ............ | F02C 7/32 |
| | | | | 60/779 |
| 2019/0309683 A1* | 10/2019 | Mackin | ............ | B64D 15/04 |
| 2021/0122478 A1* | 4/2021 | Mackin | ............ | B64D 13/08 |

* cited by examiner

ENVIRONMENTAL CONTROL SYSTEM

CROSS-REFERENCE TO RELATED APPLICATIONS

This specification is based upon and claims the benefit of priority from UK Patent Application Number GB1917964.7 filed on 9 Dec. 2019, the entire contents of which are incorporated herein by reference.

BACKGROUND

Field of the Disclosure

The present disclosure relates to an environmental control system, and a gas turbine engine including such an environmental control system.

Background of the Disclosure

Aircraft using gas turbine engines typically have an environmental control system (ECS) which provides pressurised air for use in the aircraft cabin, for cooling and for other purposes such as wing de-icing. In known arrangements, the pressurised air is supplied by being bled from one or more locations in a compressor located in the core of the gas turbine engine. However, such systems are typically designed so that the bleed air is at the maximum pressure which might eventually be required, which means that, under most conditions, the pressure of the bleed air is higher than required. In turn, this may reduce the efficiency of the engine.

In alternative known arrangements, a subsidiary compressor (i.e. a compressor separate from the engine core) is used to compress air for use in the environmental control system. However, in some circumstances, such system may not be able to provide air at a high enough pressure or temperature.

It is an aim of the present disclosure to provide an improved environmental controlled system.

SUMMARY OF THE DISCLOSURE

According to a first aspect there is provided a gas turbine engine for an aircraft comprising: an engine core comprising a turbine, a compressor, and a core shaft; and an environmental control system mounted on the engine core comprising a first air passage arranged to deliver air from outside the engine core to an aircraft cabin and/or for wing anti icing; a subsidiary compressor located in the first air passage and arranged to compress air in the first air passage, the subsidiary compressor being powered by the core shaft; and a second air passage arranged to inject air from the compressor into the first air passage.

The gas turbine engine may further comprise a fan located upstream of the engine core, the fan comprising a plurality of fan blades.

The gas turbine engine may further comprise a gearbox that receives an input from the core shaft and outputs drive to the fan so as to drive the fan at a lower rotational speed than the core shaft.

The second air passage may comprise an injection valve arranged to selectively allow or prevent flow of air therethrough.

The second air passage may be arranged to inject air from the compressor into the first air passage upstream of the subsidiary compressor.

The second air passage may be arranged to inject air from the compressor into the first air passage downstream of the subsidiary compressor.

The first air passage may be arranged to receive inlet air from the atmosphere.

The first air passage may be arranged to receive inlet air from the fan.

The environmental control system may further comprise a recirculation passage arranged to recirculate air in the first passage from downstream of the subsidiary compressor to upstream of the subsidiary compressor.

The recirculation passage may comprise a recirculation valve arranged to selectively allow or prevent flow of air therethrough.

The subsidiary compressor may be driven by a mechanical linkage with the core shaft.

The gas turbine engine may further comprise an accessory gearbox located between the core shaft and the subsidiary compressor.

The gas turbine engine may further comprise a nacelle, and the environmental control system may further comprise a third air passage in fluid communication with the second air passage and arranged to inject air from the compressor to the nacelle.

The turbine may be a first turbine, the compressor may be a first compressor, and the core shaft may be a first core shaft connecting the first turbine to the first compressor; the engine core may further comprise a second turbine, a second compressor, and a second core shaft connecting the second turbine to the second compressor; and the first turbine, first compressor, and first core shaft may be arranged to rotate at a higher rotational speed than the second core shaft.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other. Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forward most) part of the blade. The hub-to-tip ratio refers, of course, to the gas-washed portion of the fan blade, i.e. the portion radially outside any platform. The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$'s, 105 $Nkg^{-1}$'s, 100 $Nkg^{-1}$'s, 95 $Nkg^{-1}$'s, 90 $Nkg^{-1}$'s, 85 $Nkg^{-1}$'s or 80 $Nkg^{-1}$'s. The specific thrust may be in an inclusive range bounded by any two of the values in the previous sentence (i.e. the values may form upper or lower bounds), for example in the range of from 80 $Nkg^{-1}$'s to 100 $Nkg^{-1}$'s, or 85 $Nkg^{-1}$'s to 95 $Nkg^{-1}$'s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400 K, 1450 K, 1500 K, 1550 K, 1600 K or 1650 K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800 K to 1950 K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example, at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance-between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example, where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
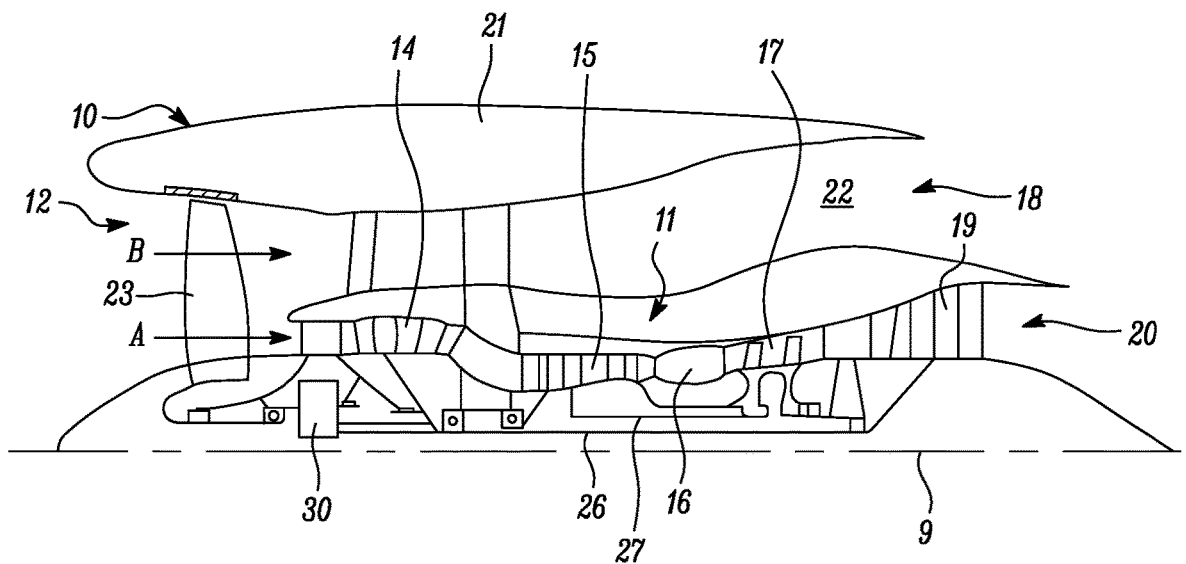
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
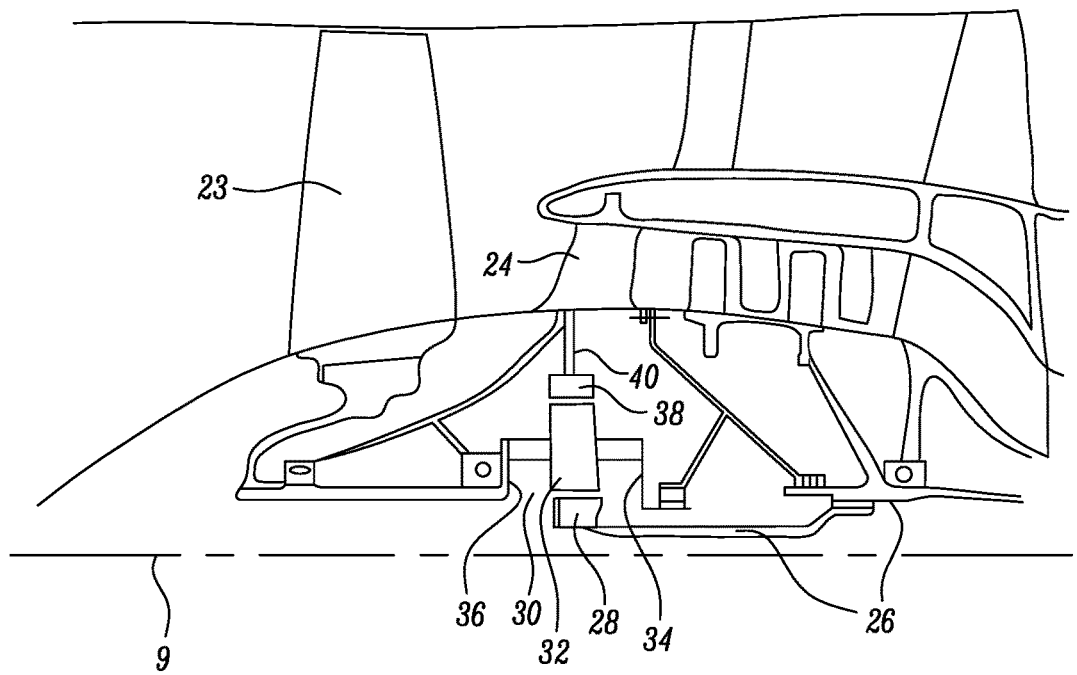
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
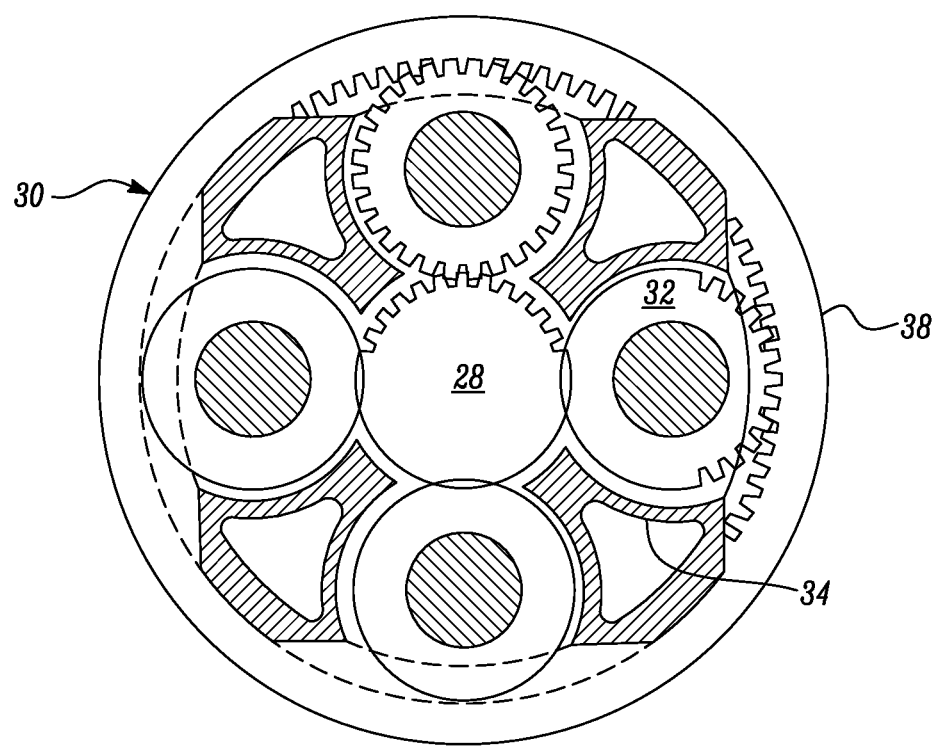
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

According to the present disclosure, there is provided a gas turbine engine, which may be a gas turbine engine as described above, including an environmental control system. The environmental control system may be used to deliver air to an aircraft cabin and/or delivering air for preventing or removing icing from the wing of an aircraft, and/or for other purposes. Such an environmental control system may be known as a cabin blower environmental control system.

Figure 4:
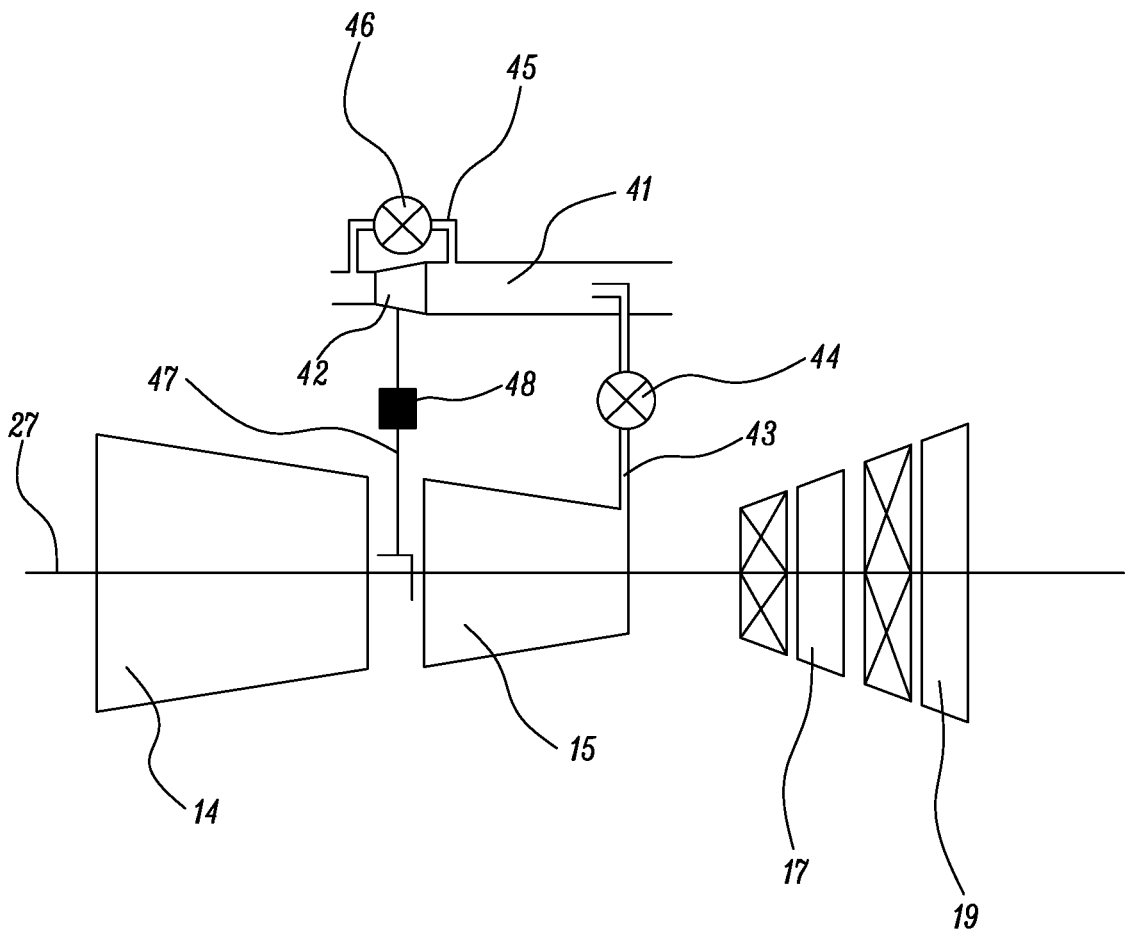
FIG. 4 is a schematic diagram of a gas turbine engine including an environmental control system according to the present disclosure.

As shown in FIG. 4, the environmental control system may be mounted on the engine core. The environmental control system includes a first air passage 41 and a subsidiary compressor 42 located in the first air passage 41. The subsidiary compressor 42 is arranged to compress air flowing through air passage 41 and is powered by at least one of the core shafts 26, 27 of the engine. The environmental control system further includes a second air passage 43, which is arranged to inject air from the compressor 15 into the first air passage 41. That is, the second passage is an air bleed passage which directs air from the compressor 15 into the first air passage 41.

The second air passage 43 may include an injection valve 44 which is arranged to selectively allow or prevent air through the second air passage 43. In other words, the injection valve 44 allows the air bleed from the bleed air passage into the first air passage 41 to be turned on or off and/or control the rate of flow. This may allow the bleed air to be, for example, turned off during normal conditions, when it may not be required, and to be turned on during other conditions when a higher temperature or pressure of air is to be delivered by the environmental control system. This may allow reduction in the power off take from an engine shaft and thus reduce the size and/or power requirement of subsidiary compressor and power transmission system components The environmental control system may further comprise a recirculation passage 45. The recirculation passage 45 is arranged to recirculate air from a location downstream of the subsidiary compressor 42 to a location upstream of the subsidiary compressor 42. That is, air which has passed through the subsidiary compressor 42 is directed such that it passes through the subsidiary compressor 42 again. This may provide improved control over the compressor, for example, during compressor surge conditions, or may also be used if the conditions of the air are such that there is a risk of icing in the subsidiary compressor 42. It may also increase the temperature or pressure of air delivered by the compressor.

The recirculation passage 45 may further comprise a recirculation valve 46, which is arranged to selectively allow or prevent the flow of air through the recirculation passage 45. In other words, the recirculation valve allows the recirculation through the recirculation passage 45 to be turned on or off.

The subsidiary compressor is powered by the rotation of a core shaft of the engine (i.e. any shaft in the core of the engine, such as the shaft 27). In other words, power from the core shaft (and thus the engine core itself) is used to power the subsidiary compressor 42. This may be achieved by a mechanical linkage 47 between the core shaft 27 and the subsidiary compressor. The mechanical linkage 47 may be a rotatable shaft which is arranged to transfer rotation of the core shaft 27 to rotation of the subsidiary compressor 42. Further, an accessory gearbox 48 may be located between the core shaft 27 and the subsidiary compressor 42, allowing the speed of the subsidiary compressor to be appropriately controlled. In particular, the accessory gear box may be part of the mechanical linkage 47.

Although the power transfer from the core shaft 27 to the subsidiary compressor 42 may be a mechanical linkage as described above, it will be appreciated that any other suitable arrangement for powering the subsidiary compressor 42 from the core shaft 27 may be used. That is to say, the core shaft 27 need not be directly mechanically connected to the subsidiary compressor. In an arrangement, the subsidiary compressor 42 may be driven by an electric motor. The electric motor may be powered by a generator drawing power from the core shaft 27. The compressor may also be driven hydraulically or pneumatically, with a fluid pump drawing power from the core shaft 27.

The subsidiary compressor may be powered by any core shaft (i.e. any shaft in the core of the engine, as described above), which may be the same core shaft which is connected to (i.e. powers) the compressor from which the air bleed is taken by the second air passage 43. However, it will also be understood that the core shaft which powers the subsidiary compressor need not be the shaft which is connected to (i.e. powers) the compressor from which the air bleed is taken by the second air passage 43, and the power for the subsidiary compressor may be taken from any suitable core shaft, independently of the location of the air bleed. Further, in a gas turbine engine where multiple shafts are present, the subsidiary compressor may be powered from any combination of shafts, including from multiple core shafts and/or other shafts.

The air which the first air passage receives to be compressed by the subsidiary compressor 42 may originate from any suitable location. For example, it may be taken from ambient air outside of the gas turbine engine through an inlet. Alternatively, it may be taken from the bypass duct of the gas turbine engine (i.e. after the fan).

In the arrangement of FIG. 4, the air bleed passage (i.e. the second air passage 43) bleeds air from the last stage of the high pressure compressor 15 (i.e. the stage with the highest pressure of compressed air). However, it will be appreciated that the air bleed may be taken from any suitable location on any of the core compressors of the gas turbine engine. For example, in the arrangement shown in FIG. 5, the air bleed passage takes air from an intermediate stage of the high pressure compressor 15. Likewise, the air bleed could be taken from any other location on the high pressure compressor, or from any suitable location on the intermediate pressure compressor 14.

Figure 6:
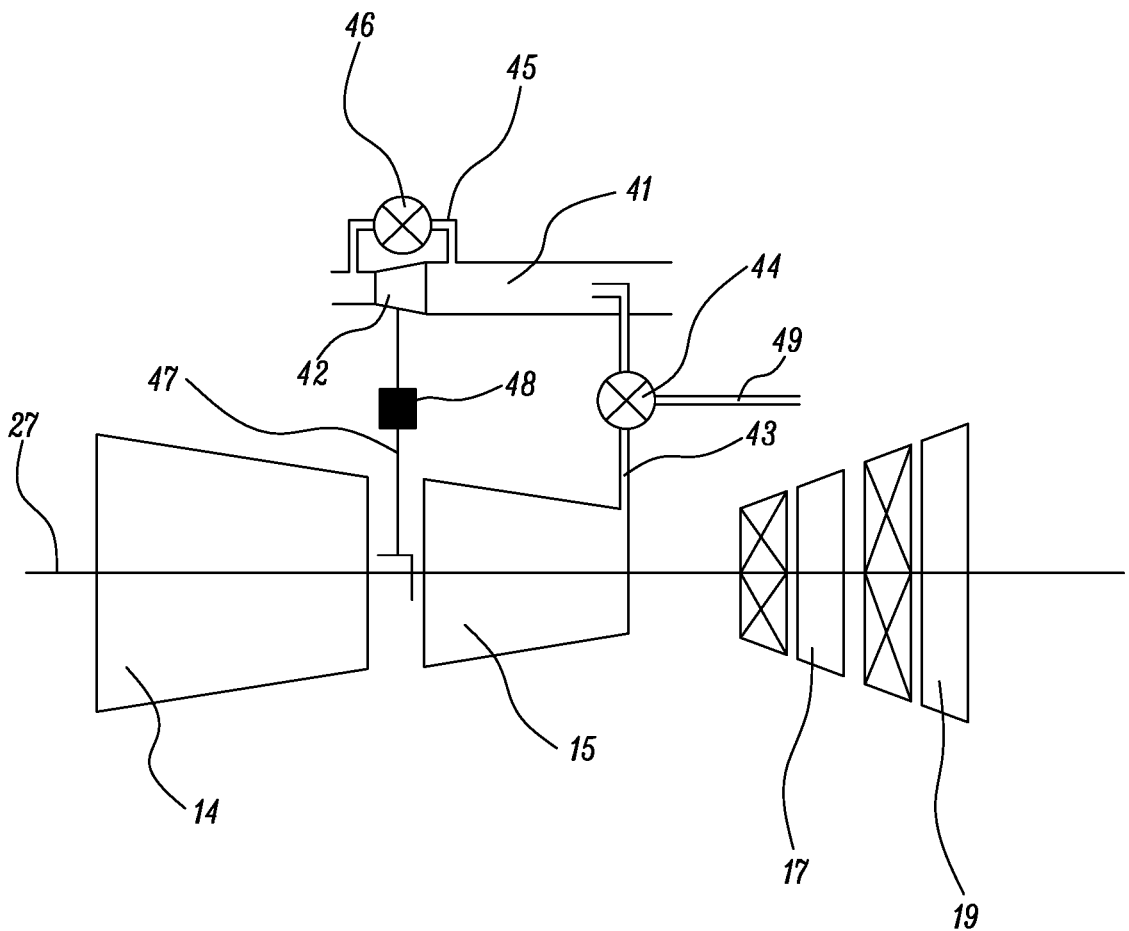
FIG. 6 shows a third arrangement of a gas turbine engine including an environmental control system according to the present disclosure.

The environmental control system may further be arranged to inject air to further locations in addition to the first air passage 41. For example, as shown in FIG. 6, the air from the high pressure compressor 15 may be directed to the nacelle 21 through a third air passage 49. This may prevent or reduce icing of the nacelle. The third air passage branches from the second air passage 43. In such an arrangement, the injection valve 44 may be a three way valve which allows the proportion of air between from the second passage 43 to the first air passage 41 and the third air passage 49 to be varied, and indeed for the air passage to both to be stopped. It will be understood that, the third air passage 49 may deliver air to other locations in the engine or outside the engine as required, in addition to or instead of the nacelle, and that any suitable valves allowing two way control, three way control, or control of more passages may be used.

Figure 7:
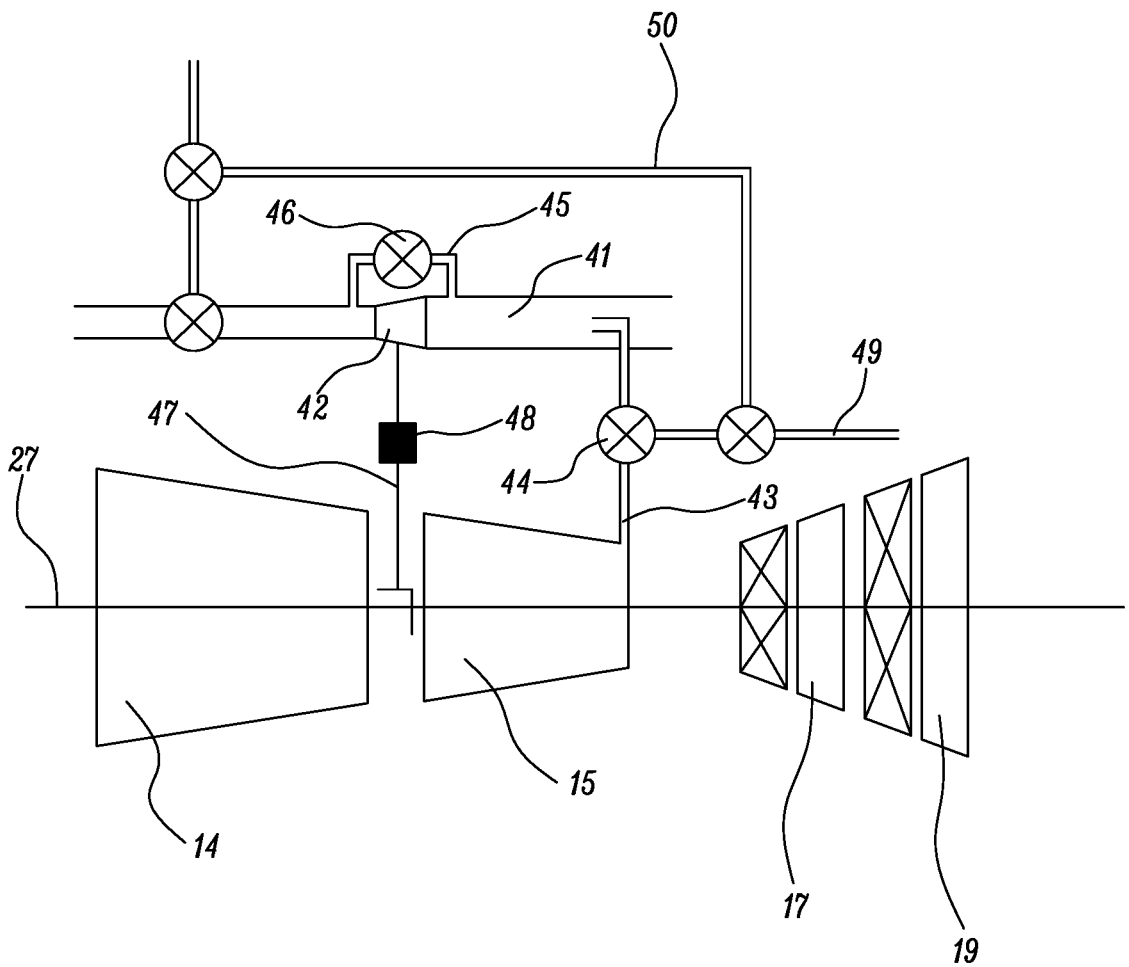
FIG. 7 shows a fourth arrangement of a gas turbine engine including an environmental control system according to the present disclosure.

For example, as shown in FIG. 7, a fourth air passage 50 which provides fluid communication between the third air passage 49 and a location downstream of the subsidiary compressor, with associated valves to control the flow through the fourth air passage 50. Depending on the operating points of the compressor 15 and the subsidiary compressor 42, air may flow in either direction along the fourth air passage 50. That is, the fourth air passage 50 may take air from the second air passage 43 and bypass the subsidiary compressor 42. Thus, the air from the fourth air passage 50 may be mixed with the air downstream of the subsidiary compressor 42. Alternatively, the fourth air passage may convey air which has passed through the subsidiary compressor to the third air passage 49, where, as described above, it can be delivered to other locations inside or outside the engine.

Thus, FIG. 7 shows an arrangement in which air from the second air passage can be selectively directed to locations both upstream and downstream of the subsidiary compressor. This may allow further control over the temperature and pressure of the air which may be used, for example, for supply to the cabin, or for deicing of the nacelles or other parts of the aircraft.

Figure 5:
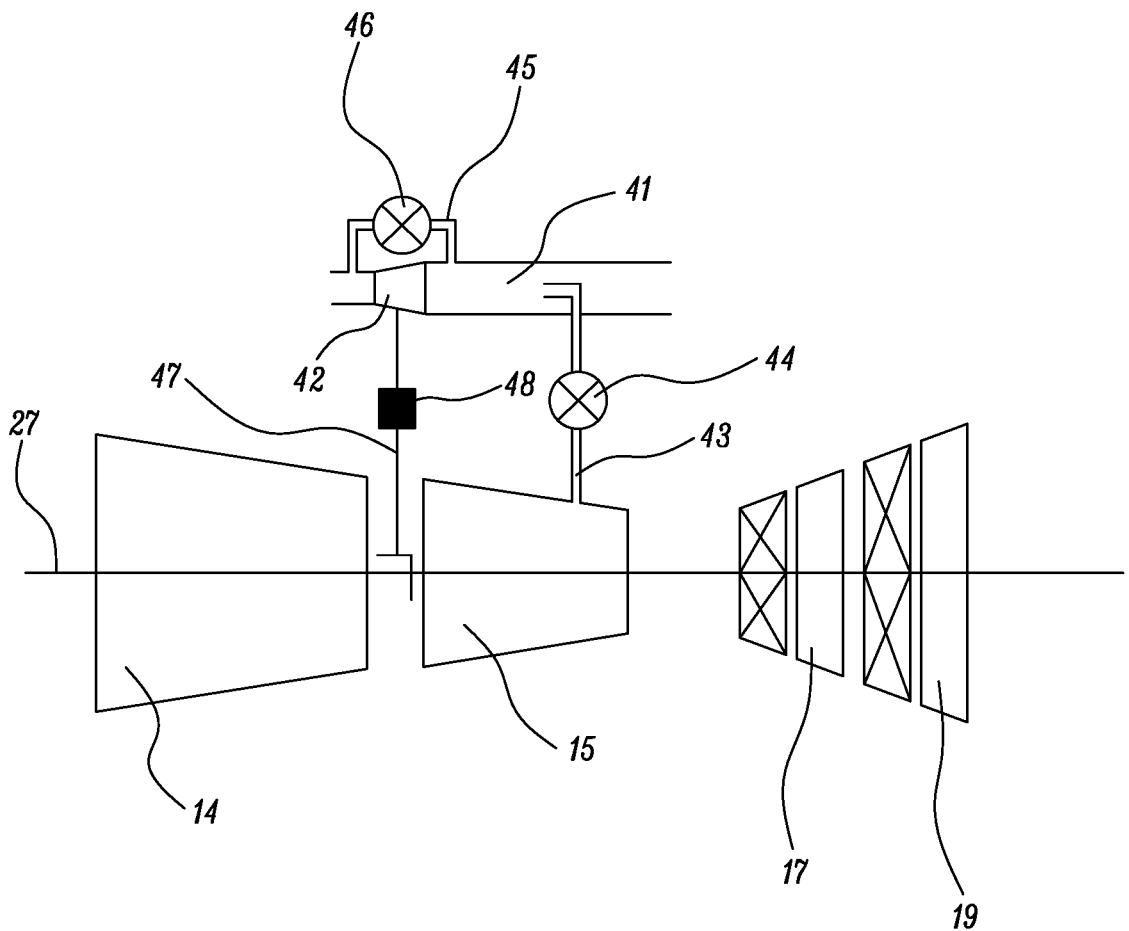
FIG. 5 shows a second arrangement of a gas turbine engine including an environmental control system according to the present disclosure.
Figure 8:
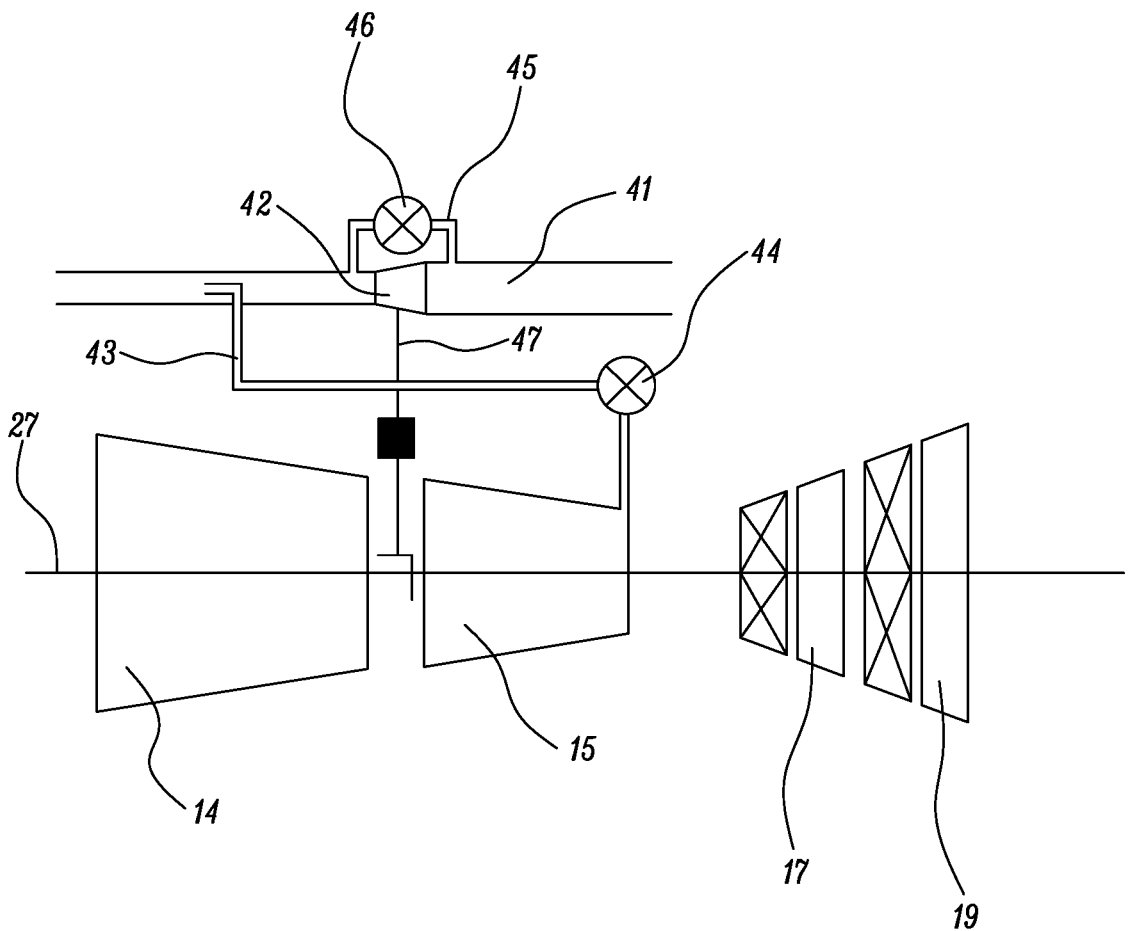
FIG. 8 shows a fifth arrangement of a gas turbine engine including an environmental control system according to the present disclosure.

In the arrangements shown in FIGS. 4-6, the second air passage 43 directs air from the compressor 15 to a location which is upstream of the subsidiary compressor 42. However, the second air passage 43 may instead (as shown in FIG. 8), or additionally (as shown in FIG. 7) provide air to a location in the first air passage 41 which is downstream of the subsidiary compressor 42. This may allow the size of the subsidiary compressor 42 to be reduced.

In the arrangements described above, and as shown in FIGS. 4-8, the cabin blower system may comprise a recirculation passage 45 and a recirculation valve 46. In the arrangements of the present disclosure, the injection of air from the compressor 15 may reduce the potential for icing in the subsidiary compressor 42. It will be understood that the recirculation bleed may thus be omitted.

It will be appreciated that the arrangements of various components as shown in FIGS. 4-8 are not mutually exclusive, and may be combined. For example, multiple bleeds (e.g. upstream and downstream of the subsidiary compressor) may be provided, and such multiple bleeds may be bled from multiple locations in the same compressor or in different compressors.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A gas turbine engine for an aircraft comprising:
an engine core comprising a turbine, a compressor, and a core shaft; and an environmental control system mounted on the engine core comprising:
a first air passage arranged to deliver air from outside the engine core to an aircraft cabin and/or for wing anti icing;
a subsidiary compressor located in the first air passage and arranged to compress air in the first air passage, the subsidiary compressor being powered by the core shaft;
a second air passage arranged to inject air from the compressor into the first air passage at a location downstream of the subsidiary compressor, the second air passage comprising an injection valve arranged to selectively allow or prevent flow of air therethrough, and
a third air passage deviating from the second air passage upstream from the location, and arranged to inject air from the compressor to a nacelle of the aircraft.

2. The gas turbine engine according to claim 1, further comprising a fan located upstream of the engine core, the fan comprising a plurality of fan blades.

3. The gas turbine engine according to claim 2, further comprising a gearbox that receives an input from the core shaft and outputs drive to the fan so as to drive the fan at a lower rotational speed than the core shaft.

4. The gas turbine engine according to claim 2, wherein the first air passage is arranged to receive inlet air from the fan.

5. The gas turbine engine according to claim 1, wherein the second air passage is arranged to inject air from the compressor into the first air passage upstream of the subsidiary compressor.

6. The gas turbine engine according to claim 1, wherein the first air passage is arranged to receive inlet air from the atmosphere.

7. The gas turbine engine according to claim 1, wherein the environmental control system further comprises a recirculation passage arranged to recirculate air in the first air passage from downstream of the subsidiary compressor to upstream of the subsidiary compressor.

8. The gas turbine engine according to claim 7, wherein the recirculation passage comprises a recirculation valve arranged to selectively allow or prevent flow of air therethrough.

9. The gas turbine engine according to claim 1, wherein the subsidiary compressor is driven by a mechanical linkage with the core shaft.

10. The gas turbine engine according to claim 1, further comprising an accessory gearbox located between the core shaft and the subsidiary compressor.

11. The gas turbine engine according claim 1, wherein:
the turbine is a first turbine, the compressor is a first compressor, and the core shaft is a first core shaft connecting the first turbine to the first compressor;
the engine core further comprises a second turbine, a second compressor, and a second core shaft connecting the second turbine to the second compressor; and
the first turbine, first compressor, and first core shaft are arranged to rotate at a higher rotational speed than the second core shaft.

\* \* \* \* \*